March 29, 1955
O. S. WILLIAMS
2,705,169
TRACTOR CAB TOP
Filed Jan. 20, 1950
2 Sheets-Sheet 1
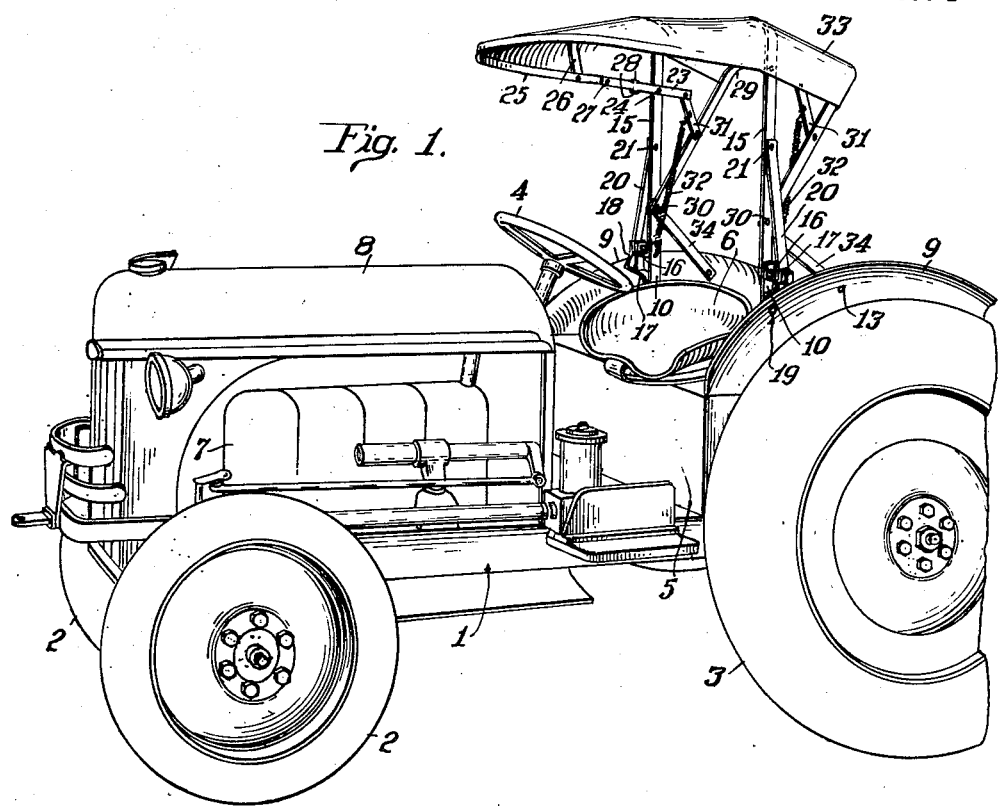
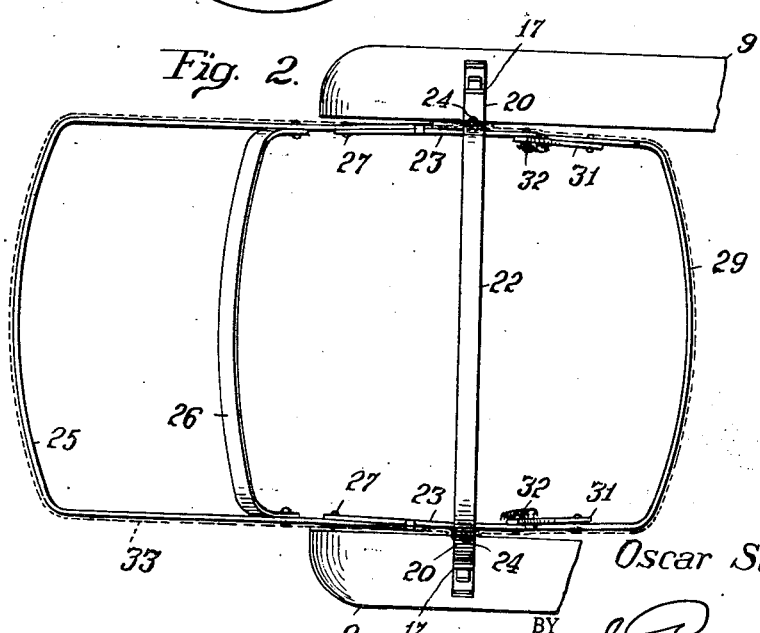
INVENTOR
Oscar Stanley Williams
BY
ATTORNEY

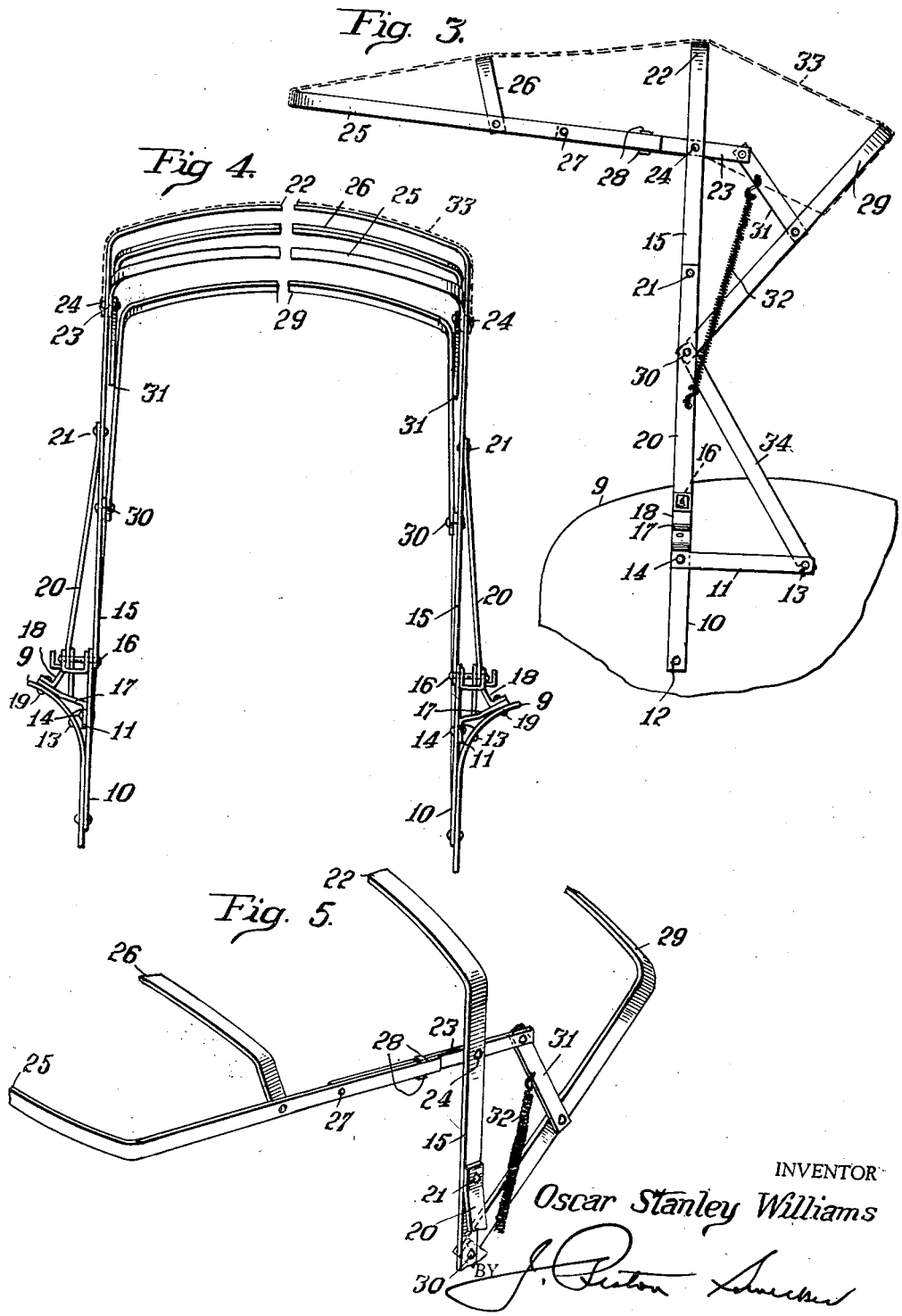

United States Patent Office 2,705,169
Patented Mar. 29, 1955

2,705,169

TRACTOR CAB TOP

Oscar Stanley Williams, Arlington, Ind.

Application January 20, 1950, Serial No. 139,610

3 Claims. (Cl. 296—111)

This invention relates to improvements in tractor cab tops of the character adapted to be applied to farm tractors and other like machines to provide a shelter and enclosure for the operator as protection from the weather during the operation of the tractor or other vehicle.

This is an improvement on the tractor cab set forth in my prior patent, No. 2,267,227, December 23, 1941, which provided for the complete all-weather protection of the operator by a more substantial structure applied to the tractor. Such a structure is more expensive to install and often is not required. Consequently, it has been customary to provide for partial enclosure of the operator's station either by a windshield and side enclosure, leaving the top open, or by an umbrella or a stationary top. Such devices have not been satisfactory for various reasons, because of the expensiveness of the construction, the unsatisfactory character in some instances of the protection afforded thereby, and often the lack of full visibility from the operator's station in all directions, particularly toward implements connected with the tractor.

One object of this invention is to improve the construction of tractor cab tops to enable these to be manufactured at low cost, to be of simple construction enabling the top to be applied easily and readily to a tractor without complex assembly detail, and to provide sufficient protection against the weather likely to be encountered in most conditions of operation of the tractor.

Another object of the invention is to improve the construction of tractor cabs by providing a folding top which may be used not only for shielding against storms, but which may be folded when not required, to allow the operator to stand erect while driving over the field and at the same time affording full and complete visibility, particularly along the rows directly from the tractor and to the implements attached to the tractor.

These objects may be accomplished according to certain embodiments of the invention, by the provision of a folding top made of simple inexpensive construction, which is adapted to be attached to supports on opposite sides of the tractor, as, for instance, on the fenders thereof, capable of shielding the operator from the sun, rain, snow, or the like. The supporting means for the top is capable not only of folding or collapsing action thereof, but also of providing substantial rigid support without adding a complex device which would be expensive to build and would interfere with the vision of the operator in all directions. A single pair of side supports may be used to hold the top in place over the operator's station, and the top structure is so collapsible that it may be folded very readily to a collapsed position which, however, will not interfere with the visibility of the operator, both fore and aft from his station on the tractor, either when standing or seated in the normal manner of driving a tractor.

One embodiment of the invention is illustrated in the accompanying drawings, in which:

Fig. 1 is a perspective view of a tractor, showing the improved top applied thereto;

Fig. 2 is a top plan view of the top structure and a portion of the tractor;

Fig. 3 is a side elevation thereof;

Fig. 4 is a rear elevation thereof; and

Fig. 5 is a detail perspective view of a portion of the top.

The invention is shown in Fig. 1 as applied to a tractor of the character generally designed as a farm tractor. This tractor is shown as having a longitudinally extending body 1 provided with front and rear supporting wheels 2 and 3, respectively. The front wheels 2 are mounted for steering, being operatively connected with a steering wheel 4 within convenient reach of an operator at a station, generally designated at 5, and usually supported on a seat 6 suitably mounted on the frame of the tractor. The rear wheels 3 are power driven from an engine, generally designated at 7, mounted on the frame 1. It is usually customary to provide a fuel tank 8 over the engine 7 to supply fuel thereto. The space beneath the fuel tank 8 between the latter and the engine is usually open at the rear for the free flow of heat from about the engine into the operator's station 5, as directed thereto under the force of the fan customarily provided for cooling the engine.

Extending over the rear wheels 3 are fenders 9 secured in the usual manner to the rear axle housings of the tractor. These fenders 9 are shown in the form of upstanding plates which curve laterally somewhat over the top of the rear wheels 3, although any suitable fenders may be used as desired, such as customarily employed in various types of tractors.

The construction described above is merely conventional, being shown and described as representing one conventional form of farm tractor to which this invention may be applied. It will be understood that the invention may be applied, if desired, to any suitable form of tractor or like vehicle and is not restricted to that shown.

I have shown in Figs. 1 to 5 the provision of a top forming an enclosure for the protection of the operator and capable of being raised, as shown in Figs. 1 and 3, or lowered to a folding position when not required. This foldable top constitutes the cab structure, and in the example illustrated as an embodiment of the invention it is shown as supported on the fenders 9.

Each of the fenders 9 is shown as having a bracket secured thereto as supporting means for the top enclosure of the cab. In the form illustrated in Fig. 3, the bracket is formed of upright and horizontal arms 10 and 11 bolted to the fender 9 at 12 and 13, respectively, and rigidly secured together at their connected ends at 14, as by welding or other suitable means. The arm 11 overlaps the arm 10 and the latter extends upwardly beyond the point of connection 14 as a means of attachment of the bracket to the top structure.

Side members 15 extend upwardly from the supporting bracket on opposite sides of the tractor. Each of the side members 15 is pivotally connected on a bolt or pin 16 with the upper end of the bracket arm 10 as supporting means for the top enclosure of the cab. As shown in Fig. 4, the pin 16 extends laterally beyond the upright arm 10 through a connected bracket 17 in the form of a clip that is braced at 18 through a bolted connection 19 with the fender 9. This forms a catch for receiving the lower end portion of an arm 20 that is pivotally connected at 21 with the side arm 15. The arm 20 is deflected laterally, as shown in Fig. 4, from the adjacent face of the arm 15 and extends downwardly parallel therewith, being pivotally connected on the same axis by means of the bolt or pin 16 to the supporting bracket. This arm 20 thus will brace the arm 15 against lateral sway or transverse stress and thereby will aid appreciably in maintaining the sturdiness and rigidity of the top.

The side arms 15 are connected together by a bowed rib 22 at their upper ends, preferably being formed in one integral piece therewith, whereby the opposite sides of the bowed rib 22 extend downward so as to form the upright arms 15. Extending horizontally from the arms 15 are side braces 23 pivotally connected at 24 with the arms 15 and extending around the front of the top in the form of a bow 25. An additional bowed rib is shown at 26 connecting together the side braces 23.

Each of the side braces 23 preferably is formed of separate sections pivotally connected together at 27 at the end of one section and spaced from the overlapped end of the other section. The said one end is provided with a U-shaped clip 28 thereon spaced from the pivot 27 in position to receive between the sides of the clip the end portion of the other section. These side braces 23 preferably are formed of spring metal that will have sufficient give so as to allow the springing of the extreme end of the other section out of the clip 28 to provide for collapsing of the sections in swinging around the pivot 27, as hereinafter described.

At the back of the top is a bowed rib 29 extending downwardly on opposite sides and pivotally connected at 30 with the upright arms 15. This bowed rib 29 has link connections 31 pivoted thereto and to the projecting rear ends of the side members 23 as a toggle joint. The link connections 31 are shown as having coiled springs 32 attached thereto and extending downwardly to the brace arms 20, tending to maintain the bowed rib 29 in its flared relation spaced from the rib 22, as shown in Fig. 3, increasing the spreading action therebetween.

Covering material is shown at 33, preferably being canvas and applied over the top portion of the enclosure, as shown in Fig. 1 and in dotted lines in Fig. 3. This covering material is secured permanently to the bowed ribs 22, 25, 26 and 29, and the latter hold the covering material properly stretched and in place as protection against rain, snow, sun, etc., when the top is in its upper position.

A locking strut is shown at 34 pivotally connected at 30 to each of the upright arms 15 and extending downwardly at an acute angle thereto for the purpose of locking the top in its upright position. The lower end of each strut 34 preferably has a notch or other opening therein for detachable engagement with the bolt or pin 13 which projects laterally from the arm 11 sufficiently for engagement therewith. The struts 34, when connected at 13, will hold the arms 15 in upright positions and thereby support the top enclosure in secure relation over the operator, whether standing or seated at the operator's station 5 or 6.

When it is desired to fold the top to a lowered position, this may be done upon disengagement of the struts 34 from the pins 13 and swinging the arms 15 in a rearward direction relative to the tractor, dropping them down substantially to a horizontal position. The sections of the side members 23 are disengaged at the clip 28, which allows these sections to fold in jack-knife fashion about the pivot 27 so that the sections attached at the pivots 24 can swing downward in counter-clockwise direction, as viewed in Fig. 3, about the pivots 24, while the forward sections of the side members 23 then swing upward about the pivots 27. The connecting links 31 also swing upward thereby and allow collapsing of the bowed ribs 29 and 22 together, whereby these several bowed ribs collapse substantially into flat relation with the top structure substantially horizontal in its lower position out of the path of view of the operator, either forward or rearward. Therefore, visibility is not interfered with either when the top is in its upper or in its lower position and he can see either the rows or the implements at all times. Furthermore, the top structure does not interfere with free access by the operator to the operator's station or the seat 6, so that he can get onto or off the tractor without difficulty.

The supporting structure, preferably, is formed of steel straps that are comparatively light in weight so as not to add appreciably to the weight of the tractor, and may be manufactured at low cost and assembled readily and easily when needed. Moreover, this construction provides a sturdy support for the top enclosure, enabling the top to be mounted on the tractor without interfering with the visiblity, as stated, and it is held rigidly against lateral sway and is suitably braced in all directions.

While I have shown and described one embodiment of the invention, it is recognized that variations and changes may be made therein without departing from the invention, as specified in the claims.

I claim:

1. A tractor cab top comprising a top covering of flexible material, upright side members having a bow connecting said members together, substantially horizontal side members pivoted to the upright side members and each extending at opposite sides from said upright side members, a bow having side members longitudinally overlapping the forward ends of the horizontal side members, means pivotally connecting each of the bow side members with an adjacent horizontal side member, means carried by one of said side members at each side of the top and spaced from the pivotal connection therebetween and in engagement with the overlapped member for holding said members substantially in horizontal alignment and against upward and downward swinging movement relative to each other, a bow extending upwardly adjacent the upright side members and pivotally connected therewith, said bows being arranged to support and stretch the top covering, and toggle means connecting the rearwardly projecting ends of the horizontal side members with the last-mentioned bow, whereby the bows are collapsed substantially into flat relation upon disengagement of the holding means.

2. A tractor cab top comprising a top covering of flexible material, upright side members having a bow connecting said members together, substantially horizontal side members pivoted to the upright side members and each extending at opposite sides from said upright side members, a bow having side members longitudinally overlapping the forward ends of the horizontal side members, means pivotally connecting each of the bow side members with an adjacent horizontal side member, means carried by one of said side members at each side of the top and spaced from the pivotal connection therebetween and in engagement with the overlapped member for holding said members substantially in horizontal alignment and against upward and downward swinging movement relative to each other, a bow extending upwardly adjacent the upright side members and pivotally connected therewith, said bows being arranged to support and stretch the top covering, links connecting the rearwardly projecting ends of the horizontal side members with the last-mentioned bow, and a coiled spring anchored at one end to one of said links and at the opposite end to the adjacent upright side member, and whereby the bows are collapsed substantially into flat relation upon disengagement of the holding means.

3. A tractor cab top comprising a top covering of flexible material, upright side members having a bow connecting said members together, substantially horizontal side members pivoted to the upright side members and each extending at opposite sides from said upright side members, a bow having side members longitudinally overlapping the forward ends of the horizontal side members, means pivotally connecting each of the bow side members with an adjacent horizontal side member, clip means carried by one of said side members at each side of the top and spaced from the pivotal connection therebetween and embracing the upper and lower edges of the overlapped member for holding said members substantially in horizontal alignment and against upward and downward swinging movement relative to each other, a bow extending upwardly adjacent the upright side members and pivotally connected therewith, said bows being arranged to support and stretch the top covering, and toggle means connecting the rearwardly projecting ends of the horizontal side members with the last-mentioned bow, whereby the bows are collapsed substantially into flat relation upon disengagement of the holding means.

References Cited in the file of this patent

UNITED STATES PATENTS

| Number | Name | Date |
|---|---|---|
| 376,414 | Pitner | Jan. 10, 1888 |
| 960,979 | Martell | June 7, 1910 |
| 986,553 | Wooddell | Mar. 4, 1911 |
| 1,034,534 | Thomas | Aug. 6, 1912 |
| 1,211,107 | Dorl | Jan. 2, 1917 |
| 1,349,045 | Buch | Aug. 10, 1920 |
| 1,389,549 | Hardin | Aug. 30, 1921 |
| 1,716,212 | Cushman | June 4, 1929 |
| 1,893,709 | Loewy | Jan. 10, 1933 |
| 2,088,557 | Grant | July 27, 1937 |
| 2,256,890 | Brown et al. | Sept. 23, 1941 |

FOREIGN PATENTS

| Number | Country | Date |
|---|---|---|
| 305,873 | Great Britain | Feb. 14, 1929 |
| 425,384 | Great Britain | Mar. 13, 1935 |
| 634,087 | Germany | Aug. 15, 1936 |